(12) United States Patent
Petrasko et al.

(10) Patent No.: US 11,060,530 B2
(45) Date of Patent: Jul. 13, 2021

(54) COMPRESSOR COOLING IN A GAS TURBINE ENGINE

(71) Applicant: General Electric Company, Schenectady, NY (US)

(72) Inventors: Gregory Michael Petrasko, Hamilton, OH (US); Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 501 days.

(21) Appl. No.: 15/861,811

(22) Filed: Jan. 4, 2018

(65) Prior Publication Data
US 2019/0203600 A1 Jul. 4, 2019

(51) Int. Cl.
*F04D 29/58* (2006.01)
*F04D 29/00* (2006.01)

(52) U.S. Cl.
CPC ........... *F04D 29/584* (2013.01); *F04D 29/00* (2013.01)

(58) Field of Classification Search
CPC .... F04D 29/58; F04D 29/5806; F04D 29/582; F04D 29/584; F04D 29/5846; F01D 5/08; F01D 5/081; F01D 5/082; F01D 5/084; F01D 5/085; F01D 5/088
See application file for complete search history.

(56) References Cited

U.S. PATENT DOCUMENTS

| | | | |
|---|---|---|---|
| 4,808,073 A * | 2/1989 | Zaehring | F01D 5/081 415/175 |
| 5,297,386 A | 3/1994 | Kervistin | |
| 6,361,277 B1 | 3/2002 | Bulman et al. | |
| 6,382,903 B1 | 5/2002 | Caruso et al. | |
| 7,017,349 B2 | 3/2006 | Laurello et al. | |
| 7,993,102 B2 | 8/2011 | Desai et al. | |
| 8,277,170 B2 | 10/2012 | Hess et al. | |
| 8,348,608 B2 | 1/2013 | Willett et al. | |
| 8,932,007 B2 | 1/2015 | Khanin et al. | |
| 8,979,470 B2 | 3/2015 | Riazantsev et al. | |
| 9,670,780 B2 * | 6/2017 | Baxley | F01D 5/085 |
| 9,719,425 B2 | 8/2017 | Roush | |
| 2014/0248122 A1 | 9/2014 | Vetters et al. | |
| 2014/0290272 A1* | 10/2014 | Mulcaire | F01D 25/12 60/806 |
| 2015/0308341 A1 | 10/2015 | Hiester | |

(Continued)

FOREIGN PATENT DOCUMENTS

GB 2299378 A * 10/1996 ........... F04D 29/584

*Primary Examiner* — Richard A Edgar
(74) *Attorney, Agent, or Firm* — Dority & Manning, P.A.

(57) ABSTRACT

A gas turbine engine includes a combustion section and a compressor section, the compressor section including a high pressure compressor. The high pressure compressor includes an aft-most compressor stage and an upstream compressor stage, each of the aft-most compressor stage and the upstream compressor stage including a rotor disk. The gas turbine engine also includes a high pressure spool assembly, the high pressure spool assembly including a rotor disk, and an airflow member extending from the rotor disk of the high pressure spool assembly to the rotor disk of the upstream compressor stage of the high pressure compressor to define in part a compressor cooling air passage outward of the airflow member along a radial direction.

20 Claims, 7 Drawing Sheets

(56) References Cited

U.S. PATENT DOCUMENTS

| | | |
|---|---|---|
| 2016/0076379 A1* | 3/2016 | Forcier ................. F04D 29/321 |
| | | 416/1 |
| 2016/0076381 A1* | 3/2016 | Suciu ...................... F01D 5/066 |
| | | 416/1 |
| 2016/0186571 A1 | 6/2016 | Suciu et al. |
| 2016/0312615 A1 | 10/2016 | Lyons |
| 2016/0333700 A1 | 11/2016 | Taheny |
| 2017/0002834 A1 | 1/2017 | Powell et al. |
| 2017/0030196 A1 | 2/2017 | Pirker et al. |
| 2017/0211590 A1* | 7/2017 | Moniz ..................... F01D 5/085 |

\* cited by examiner

COMPRESSOR COOLING IN A GAS TURBINE ENGINE

FIELD

The present subject matter relates generally to a gas turbine engine, and more specifically features for cooling a high pressure compressor of a gas turbine engine.

BACKGROUND

A gas turbine engine typically includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator. For example, in at least certain embodiments, the gas turbine engine may further include a fan driven by the one or more turbines.

In order to increase an efficiency of the gas turbine engine it is generally desirable to increase an overall pressure ratio defined by the compressor section, including the one or more compressors, during operation. However, with the increased pressures within the compressor section, a temperature of the airflow therethrough, and accordingly, the components exposed to such airflow, increases. If not managed appropriately, the increased temperatures may prematurely wear or otherwise damage the components exposed to the airflow through the compressor section. Accordingly, a gas turbine engine having one or more features allowing for the desired increased pressures without exceeding temperature thresholds of the various components of the compressor section would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine defining a radial direction is provided. The gas turbine engine includes a combustion section and a compressor section including a high pressure compressor, the high pressure compressor including an aft-most compressor stage and an upstream compressor stage, each of the aft-most compressor stage and the upstream compressor stage including a rotor disk. The gas turbine engine also includes a high pressure spool assembly, the high pressure spool assembly including a rotor disk, and an airflow member extending from the rotor disk of the high pressure spool assembly to the rotor disk of the upstream compressor stage of the high pressure compressor to define in part a compressor cooling air passage outward of the airflow member along the radial direction.

In certain exemplary embodiments the rotor disk of the upstream compressor stage includes a rotor bore, wherein the rotor disk of the high pressure spool assembly includes a rotor bore, and wherein the airflow member extends from the rotor bore of the rotor disk of the high pressure spool assembly to the rotor bore of the rotor disk of the upstream compressor stage.

In certain exemplary embodiments the airflow member is positioned inward of the rotor disk of the aft-most compressor stage along the radial direction.

For example, in certain exemplary embodiments the high pressure compressor further includes an intermediate compressor stage located between the aft-most compressor stage and the upstream compressor stage, wherein the intermediate compressor stage includes a rotor disk, and wherein the airflow member extends inward of the rotor disk of the intermediate compressor stage along the radial direction.

For example, in certain exemplary embodiments the rotor disk of the intermediate compressor stage includes a rotor bore, and wherein the airflow member includes at least one of a metering feature or an airflow directing feature operable with the rotor bore of the rotor disk of the intermediate compressor stage to modify an airflow between the rotor bore of the rotor disk of the intermediate compressor stage and the airflow member.

In certain exemplary embodiments the high pressure spool assembly further includes a cone arm extending from the rotor disk of the high pressure spool assembly to the rotor disk of the aft-most compressor stage of the high pressure compressor.

For example, in certain exemplary embodiments the combustion section includes an outlet guide vane located downstream of the high pressure compressor and an inner support arm supporting the outlet guide vane, wherein the inner support arm and the cone arm together define at least in part a forward seal cavity, and wherein the gas turbine engine further includes a compressor cooling air system, the compressor cooling air system configured to provide compressor cooling air to the forward seal cavity, the high pressure spool assembly defining one or more airflow openings extending from the forward seal cavity to the compressor cooling air passage.

For example, in certain exemplary embodiments the high pressure spool assembly includes an airflow flange, wherein the airflow flange defines the one or more airflow openings such that the forward seal cavity is in airflow communication with the compressor cooling air passage through the airflow flange.

For example, in certain exemplary embodiments the cone arm defines the one or more airflow openings extending from the forward seal cavity to the compressor cooling air passage.

For example, in certain exemplary embodiments the combustion section includes a compressor discharge pressure seal at least partially sealing off the forward seal cavity, and wherein at least a portion of the compressor discharge pressure seal is coupled to the high pressure spool assembly.

In certain exemplary embodiments the airflow member includes a plurality of airflow features extending into the compressor cooling air cavity.

For example, in certain exemplary embodiments the plurality of airflow features extend generally along an axial direction of the gas turbine engine.

In certain exemplary embodiments the airflow member extends continuously and directly from the rotor disk of the high pressure spool assembly to the rotor disk of the upstream compressor stage.

In certain exemplary embodiments the compressor section defines in part a core air flowpath through the gas turbine engine, wherein the rotor disk of the upstream compressor stage defines a cooling hole in airflow communication with the cooling air passage to provide a cooling airflow from the cooling air passage to one or more components of the upstream compressor stage exposed to the core air flowpath.

In certain exemplary embodiments the compressor section defines in part a core air flowpath through the gas turbine engine, wherein the aft-most compressor stage is stage N of the high pressure compressor, wherein the high pressure compressor further includes a stage N−1 having a rotor disk and located immediately upstream of the stage N, wherein the high pressure compressor further includes a catenary arm extending from the rotor disk of the stage N to the rotor disk of the stage N−1, and wherein the catenary arm, the rotor disk of the stage N−1, or both defines a cooling hole to provide a cooling airflow from the cooling air passage to one or more components of the high pressure compressor exposed to the core air flowpath.

In another exemplary embodiment of the present disclosure, a cooling air passage assembly for a gas turbine engine is provided. The gas turbine engine includes a high pressure compressor and a high pressure spool assembly, the high pressure compressor including an aft-most compressor stage and an upstream compressor stage, each of the aft-most compressor stage, the upstream compressor stage, and the high pressure spool assembly including a rotor disk. The cooling air passage includes an airflow member extending from a first attachment end to a second attachment end, the first attachment end configured for attachment to the rotor disk of the aft-most compressor stage of the high pressure compressor, and the second attachment end configured for attachment to the rotor disk of the high pressure spool assembly to define in part a compressor cooling air passage.

In certain exemplary embodiments the airflow member includes a plurality of airflow features configured to extend into the compressor cooling air cavity.

For example, in certain exemplary embodiments the plurality of airflow features extend generally along an axial direction of the gas turbine engine when the cooling air passage is installed in the gas turbine engine.

In certain exemplary embodiments the airflow member extends continuously from the first attachment end to the second attachment end.

In certain exemplary embodiments the cooling air passage further includes a metering feature extending from the airflow member for metering an airflow over the airflow member.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Figure 1:
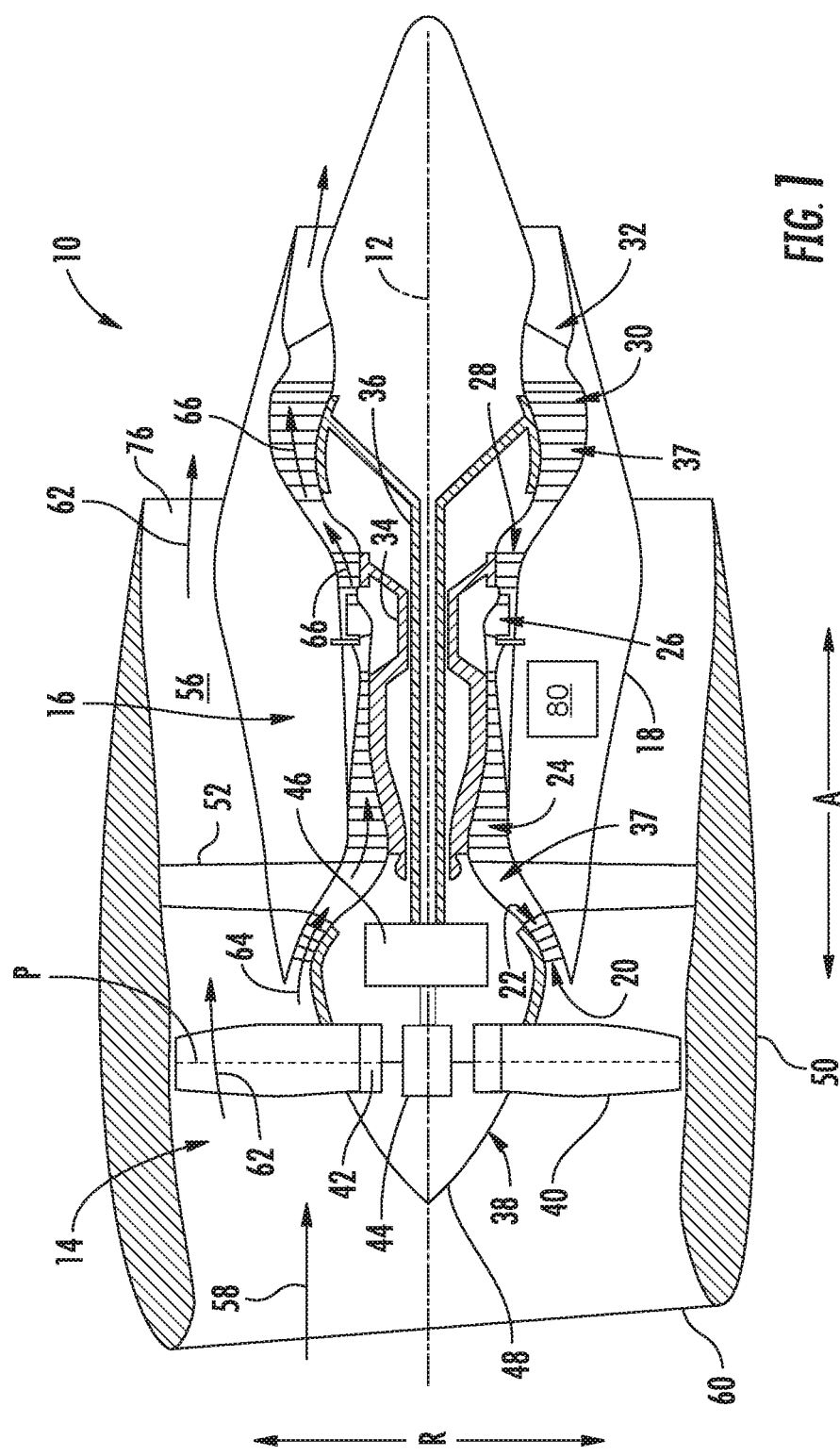
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the Figs., FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 (or rather a high pressure spool assembly, as described below) drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Moreover, as is depicted schematically, the exemplary turbofan engine 10 further includes various accessory systems to aid in the operation of the turbofan engine 10. For example, the exemplary turbofan engine 10 further includes a compressor cooling air system 80 for providing cooled air to one or more components of the HP compressor 24. The compressor cooling air system 80 will be described in greater detail below.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc., or alternatively may be any gas turbine engine for use in aeroderivative industries, power generation industries, etc.

Figure 2:
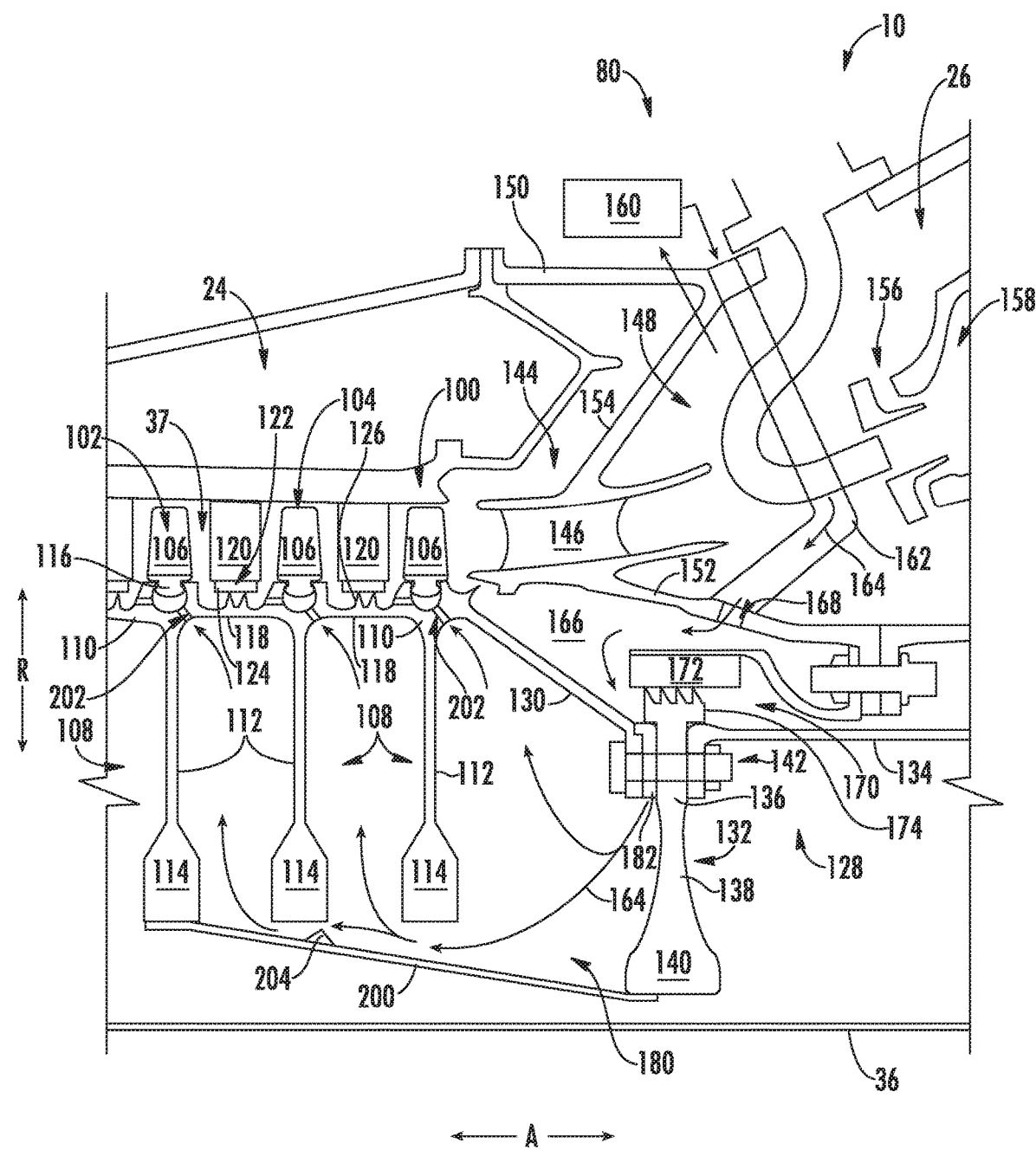
FIG. 2 is a close-up, schematic, cross-sectional view of a portion of a compressor section and combustion section of the exemplary gas turbine engine of FIG. 1.

Referring now to FIG. 2, a close-up, cross-sectional view of a section of the exemplary gas turbine engine 10 described above with reference to FIG. 1 is provided. More particularly, FIG. 2 depicts an aft end, or downstream end, of the exemplary HP compressor 24 of the gas turbine engine 10 depicted in FIG. 1, as well as a forward end, or upstream end of the exemplary combustion section 26 of the turbine gas turbine engine 10 depicted in FIG. 1.

Referring first to the HP compressor 24, the HP compressor 24 generally includes a plurality of stages. For example, the HP compressor 24 generally includes an aft-most compressor stage 100 and an upstream compressor stage 102. The upstream compressor stage 102 may be immediately upstream of the aft-most compressor stage 100, or alternatively, such as in the embodiment depicted, may be positioned further upstream of the aft-most compressor stage 100. More particularly, for the exemplary embodiment depicted, the HP compressor 24 further includes an intermediate compressor stage 104 located between the aft-most compressor stage 100 and the upstream compressor stage 102 (i.e. forward of the aft-most compressor stage 100 and aft of the upstream compressor stage 102).

Each of the compressor stages 100, 102, 104 may also be referred to relative to the total number, N, of compressor stages of the HP compressor 24. For example, the aft-most compressor stage 100 may also be referred to as stage N, the intermediate compressor stage 104 may also be referred to as stage N−1, and the upstream compressor stage 102 may also be referred to as stage N−2.

Moreover, it will be appreciated that each of the various stages of the HP compressor 24 generally includes a plurality of compressor rotor blades 106 and a rotor disk 108. Each of the plurality of compressor rotor blades 106 of a given stage are coupled to the respective rotor disk 108, such that the plurality of compressor rotor blades 106 and rotor disk 108 rotate together during operation. As will be discussed in greater detail below, each of the rotor disks 108 generally includes an attachment portion 110, a rotor web 112, and a rotor bore 114. The attachment portion 110 it is, for the embodiment shown, a circumferential slot, such as a circumferential dovetail slot, for receiving a correspondingly shaped portion of a base 116 of the respective compressor rotor blades 106. However, in other exemplary embodiments, any other suitable configuration may be provided for attaching the plurality of compressor rotor blades 106 of a given stage to a rotor disk 108 of such stage. For example, in other exemplary embodiments, the attachment portion 110 of the rotor disk 108 may define one or more axial slots, or alternatively, the compressor rotor blades and rotor disk 108 may be formed together as a blisk.

Referring still to FIG. 2, the rotor web 112, as is depicted, extends generally inwardly along the radial direction R to the rotor bore 114, with the rotor web 112 and rotor bore 114 generally being annular in shape. Further, each of the plurality of rotor disks 108 are coupled to an adjacent rotor disk 108 through a catenary arm 118 extending therebetween.

For the embodiment depicted, each of the stages of the HP compressor 24 further comprises a plurality of compressor stator vanes 120. In such a manner, the HP compressor 24 includes a row of compressor stator vanes 120 positioned between adjacent rows of compressor rotor blades 106. The compressor stator vanes 120 are operable to modify an airflow through a portion of the core air flowpath 37 defined at least in part by the HP compressor 24. Each of the compressor stator vanes 120 depicted generally defines an inner end 122 along the radial direction R and includes a seal member 124 at the inner end 122.

Accordingly, it will be appreciated that the HP compressor 24 is configured to form a seal between rotating components and stationary components between adjacent stages. More specifically, for the embodiment shown, each of the catenary arms 118 between rotor disks 108 of adjacent stages of the HP compressor 24 includes seal teeth 126 operable with respective seal members 124 at the inner ends 122 of the compressor stator vanes 120 to form a seal therebetween. Such may increase an efficiency of the HP compressor 24 by preventing relatively high pressure air at an upstream end of the compressor stator vane 120 from flowing around the inner end 122 to a relatively low pressure location at a downstream end of the compressor state vane 120.

Furthermore, as will be appreciated, the HP compressor 24 is driven through a high pressure spool assembly 128 (the high pressure spool assembly 128 depicted as, and described above with reference to, numeral 34 in FIG. 1). The high pressure spool assembly 128, for the embodiment depicted, generally includes a cone arm 130, a rotor disk 132, and a spool member 134. The cone arm 130 is coupled to the rotor disk 108 of the aft-most compressor stage 100, and generally extends aft to the rotor disk 132 of the high pressure spool assembly 128. The spool member 134 of the high pressure spool assembly 128, in turn, extends from the rotor disk 108 aft towards the HP turbine 28 (see FIG. 1). The rotor disk 132 of the high pressure spool assembly 128 generally includes an attachment portion 136, a rotor web 138, and a rotor bore 140. The cone arm 130, attachment portion 136 of the rotor disk 132, and spool member 134 each together form at least in part a joint 142, as will be described in more detail below.

Referring still to FIG. 2, compressed air from the HP compressor 24 is provided through a bleed off-take slot (or simply "bleed slot") 144 of the combustion section 26. The bleed slot 144 generally includes a plurality of circumferentially spaced outlet guide vanes 146 configured to deswirl compressed air from the HP compressor 24 and provide such compressed air to a forward combustion cavity 148. The plurality of outlet guide vanes 146 are supported relative to an outer combustor case 150 through an outer OGV support arm 154 and an inner OGV support arm 152. Notably, for the embodiment depicted, the outer OGV support arm 154 and inner OGV support arm 152 each also define at least in part the forward combustion cavity 148.

As will also be appreciated, the combustion section 26 further includes a plurality of fuel-air mixers 156 configured to mix the compressed air within the forward combustion cavity 148 with fuel and provide such fuel-air mixture to a combustion chamber 158 to generate combustion gases.

Furthermore, as briefly noted above with reference to FIG. 1, the exemplary gas turbine engine 10 further includes a compressor cooling air system 80. The compressor cooling air system 80 is configured generally to provide a cooling airflow (compressor cooling air 164, described below) to be used to cool one or more components of the HP compressor 24. More particularly, the exemplary compressor cooling air system 80 depicted generally includes a heat exchanger 160 and a cooling air conduit 162. The heat exchanger 160 is configured, for the embodiment depicted, to receive compressed air from the forward combustion cavity 148, cool such compressed air by transferring heat therefrom to a heat sink (not shown), and provide compressor cooling air 164 to the cooling air conduit 162. The cooling air conduit 162 extends through the forward combustion cavity 148 to the inner OGV support arm 152.

Moreover, as is depicted, the inner OGV support arm 152 and cone arm 130 of the high pressure spool assembly 128 together define at least in part a forward seal cavity, or more particularly for the embodiment depicted, a forward compressor discharge pressure ("CDP") seal cavity 166. The inner OGV support arm 152 defines one or more openings 168 allowing for a flow of the compressor cooling air 164 therethrough to the forward CDP seal cavity 166. As will be discussed in greater detail below, the compressor cooling air 164 provided to the CDP seal cavity 166 will subsequently be used to cool at least one or more components of the HP compressor 24.

Notably, positioned within the forward CDP seal cavity 166 is a CDP seal 170. The CDP seal 170 generally includes a stationary seal member 172 coupled to the inner OGV support arm 152 and a rotating seal tooth assembly 174. At least a portion of the CDP seal 170 is coupled to the high pressure spool assembly 128, or more specifically, the rotating seal tooth assembly 174 is coupled to the high pressure spool assembly 128. More specifically, still, the rotating seal tooth assembly 174 is coupled to the high pressure spool assembly 128 at the joint 142. The rotating seal tooth assembly 174 is configured to form a seal with the stationary seal number 172 to meter an amount of airflow from the forward CDP seal cavity 166 that is allowed aft to the turbine section.

Referring still to FIG. 2, the high pressure spool assembly 128 defines one or more airflow openings 178 (see FIG. 4, discussed below) extending from the forward CDP seal cavity 166 to a compressor cooling air passage 180. More specifically, for the embodiment depicted, the high pressure spool assembly 128 includes an airflow flange 182 positioned at the joint 142. For the embodiment depicted, the airflow flange 182 is positioned between the cone arm 130 and the attachment portion 136 of the rotor disk 132 of the high pressure spool assembly 128. As will be discussed in greater detail below, the airflow flange 182 defines a plurality of apertures 194 extending from an outer end 196 of the airflow flange 182 along the radial direction R towards an inner end 198 of the airflow flange 182 along the radial direction R (see FIGS. 4 and 5).

Figure 3:
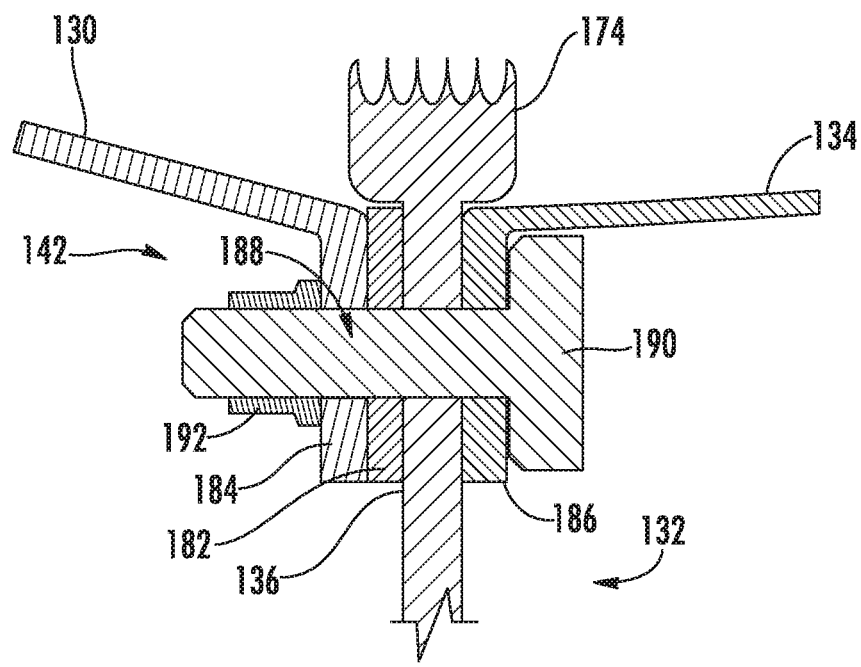
FIG. 3 is a close-up, cross-sectional view of a joint of a high pressure spool assembly of the exemplary gas turbine engine of FIG. 1 at a first circumferential location.
Figure 4:
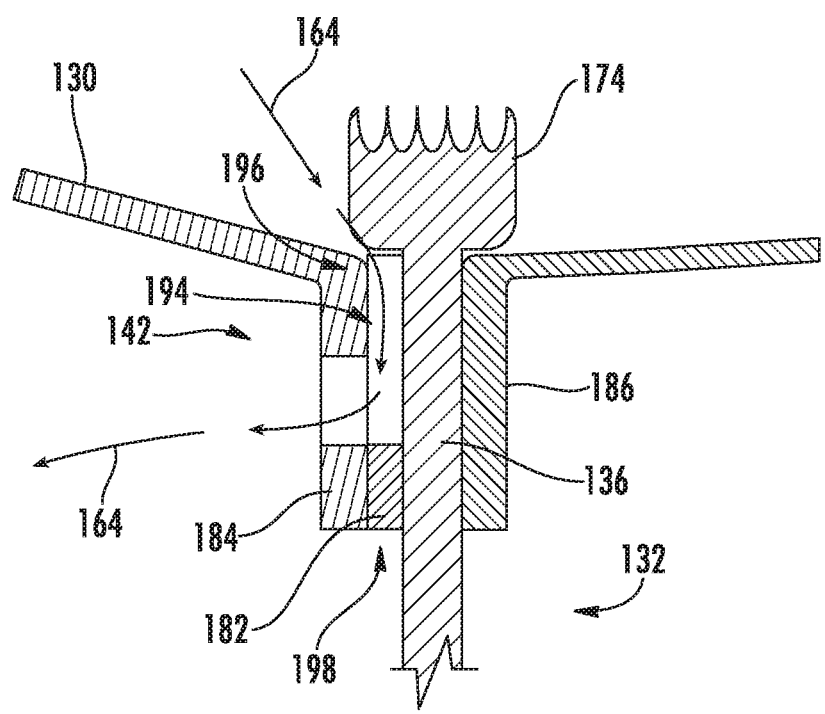
FIG. 4 is a close-up, cross-sectional view of the joint of the high pressure spool assembly of the exemplary gas turbine engine of FIG. 1 at a second circumferential location.
Figure 5:
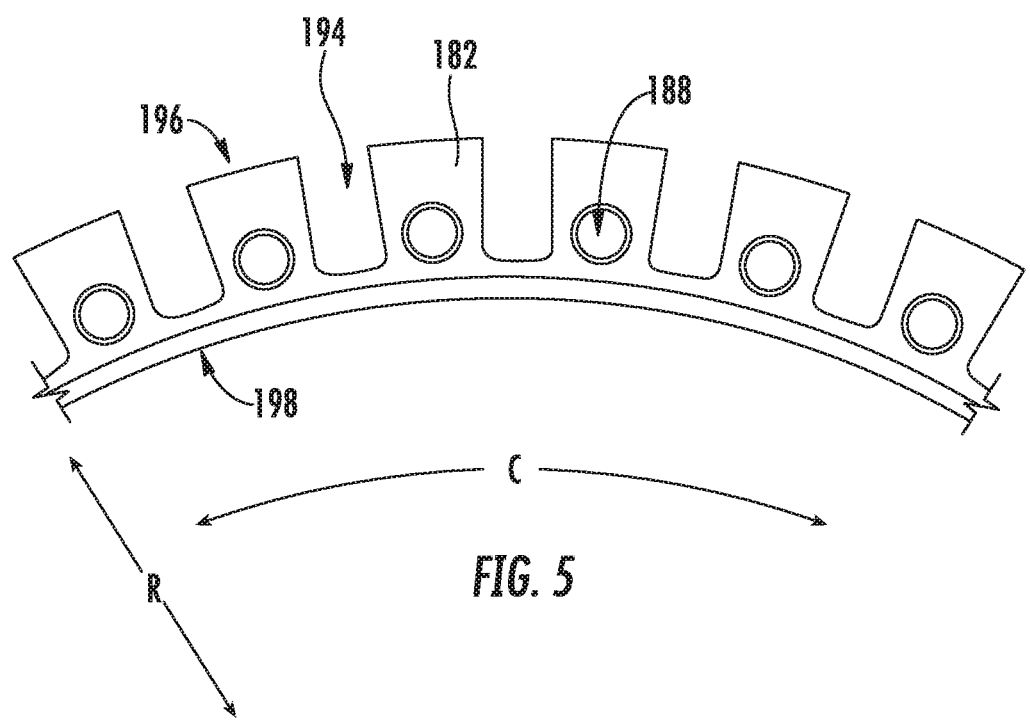
FIG. 5 is an isolated view of an airflow flange of the exemplary joint depicted in FIGS. 3 and 4.

More particularly, referring now to FIGS. 3 through 5, it will be appreciated that the cone arm 130 and spool member 134 each further include an attachment flange 184, 186, respectively. FIG. 3 is a close-up, cross-sectional view of the joint 142 of the high pressure spool assembly 128 at a first circumferential location; FIG. 4 is a close-up, cross-sectional view of the joint 142 of the high pressure spool assembly 128 at a second circumferential location; and FIG. 5 is an isolated view of the airflow flange 182 of the joint 142 depicted in FIGS. 3 and 4.

As may be seen in FIG. 3, the attachment flanges 184, 186 of the cone arm 130 and spool member 134, the airflow flange 182, and the attachment portion 136 of the rotor disk 132 of the high pressure spool assembly 128 together form the joint 142. Moreover, the attachment flanges 184, 186 of the cone arm 130 and spool member 134, as well as the airflow flange 182 and the attachment portion 136 of the rotor disk 132 of the high pressure spool assembly 128, each define a respective plurality of aligned bolt holes 188 extending axially through the joint 142. A plurality of bolts 190 are provided, disposed through the corresponding bolt holes 188, and the bolts 190 are secured in place with nuts 192.

Further, as is depicted in FIG. 4, the attachment flange 184 of the cone arm 130 and the airflow flange 182 each further define a plurality of apertures 194 (which for the embodiment depicted are the openings 178). As will be appreciated, the plurality of apertures 194 may be circumferentially spaced evenly between the bolt holes 188 (i.e., spaced along a circumferential direction C oh the gas turbine engine 10; see FIG. 5). For example, the plurality of apertures 194 may be disposed between two circumferentially adjacent bolt holes 188. Referring particularly to FIG. 5, such a configuration is depicted. As is shown, the airflow flange 182 defines the plurality of bolt holes 188, and further defines the plurality of apertures 194 disposed between two circumferentially adjacent bolt holes 188. Moreover, the plurality of apertures 194 extend generally from an outer end 196 of the airflow flange 182 along the radial direction R towards (and more specifically, substantially to) an inner end 198 of the airflow flange 182 along the radial direction R. In such a manner, it will be appreciated, that the compressor cooling air 164 provided to the forward CDP seal cavity 166 may flow through the joint 142 to the compressor cooling air passage 180. Notably, although the airflow flange 182 is depicted as a single, integrally formed component, in other embodiments, the airflow flange 182 may instead be a plurality of separate pieces, arranged, e.g., circumferentially.

Notably, by utilizing the airflow flange 182 to provide the compressor cooling air 164 to the cooling air passage 180, the compressor cooling air 164 flowing therethrough may also be rotated in the circumferential direction C during operation by virtue of the rotation of the airflow flange 182 and apertures 194 therein. Such may prevent the compressor cooling air 164 from unnecessarily heating up when reaching the cooling air cavity 180.

Referring back to FIG. 2, it will be appreciated that the exemplary gas turbine engine 10 further includes features for directing the compressor cooling air 164 provided through the joint 142 to one or more components of the HP compressor 24. More specifically, for the embodiment shown, the gas turbine engine 10 further includes an airflow member 200 extending from the rotor disk 132 of the high pressure spool assembly 128 to the rotor disk 108 of the upstream compressor stage 102 of the HP compressor 24 to define in part the compressor cooling air passage 180. The airflow member 200 may be a plate or a cover plate, or any other suitable structure to form a pressurized cavity (i.e., the compressor cooling air passage 180), as will be discussed in more detail below. For example, the airflow member 200 may generally be any solid (i.e., substantially non-porous), substantially conical member (formed of one or more components) extending from the rotor disk 132 of the high pressure spool assembly 128 to the rotor disk 108 of the upstream compressor stage 102 of the HP compressor 24 to define in part the compressor cooling air passage 180. The compressor cooling air passage 180 is, as shown, positioned outward of the airflow member 200 along the radial direction R. More specifically, for the embodiment depicted, the airflow member 200 extends from the rotor bore 140 of the rotor disk 132 of the high pressure spool assembly 128 to the rotor bore 114 of the rotor disk 108 of the upstream compressor stage 102. Notably, it will be appreciated that for the embodiment depicted, the airflow member 200 is a substantially annular member (i.e., extends along the circumferential direction C; see, e.g., FIG. 8), and further that for the embodiment depicted, the airflow member 200 extends continuously and directly from the rotor disk 132 of the high pressure spool assembly 128 to the rotor disk 108 of the upstream compressor stage 102. In such a manner, it will be appreciated that the airflow member 200 extends inward of the rotor disks 108 of the intermediate compressor stage 104 and aft-most compressor stage 100 along the radial direction R, and more specifically, inward of the rotor bores 114 of the rotor disks 108 of the intermediate compressor stage 104 and aft-most compressor stage 100 along the radial direction R.

It will be appreciated, however, that the airflow member 200 depicted in FIG. 2 is provided by way of example only, and that in other exemplary embodiments, the airflow member 200 may have any other suitable configuration. For example, in other embodiments, the airflow member 200 may instead be attached to any other suitable portion of the respective rotor disks 108. Additionally, although for the embodiment depicted, the upstream compressor stage 102 is depicted as a stage N-2 compressor stage, in other embodiments, the upstream compressor stage 102 may be configured as any other compressor stage within the HP compressor 24 upstream of the aft-most compressor stage 100. Accordingly, in other exemplary embodiments, the upstream compressor stage 102 may be immediately upstream of the aft-most compressor stage 100, such that the exemplary HP compressor 24 does not include an intermediate compressor stage 104 position therebetween, or alternatively the upstream compressor stage 102 may be further upstream (e.g., stage N-3, stage N-4, etc.).

Further, as is depicted, the HP compressor 24 includes features for providing the compressor cooling air 164 provided to the cooling air passage 180 through the joint 142 to one or more components of the HP compressor 24 exposed to the core air flowpath 37. More specifically, as shown, the catenary arm 118 extending between the rotor disks 108 of the aft-most compressor stage and intermediate compressor stage 104, the catenary arm 118 extending between the rotor disks 108 of the intermediate compressor stage 104 and the upstream compressor stage 102, the rotor disk 108 of the upstream compressor stage 102, the rotor disk 108 of the intermediate compressor stage 104, or a plurality of these components define one or more cooling holes 202 to allow compressor cooling air 164 from the cooling air passage 180 to one or more components of the HP compressor 24 exposed to the core air flowpath 37 to cool the one or more components of the HP compressor 24 exposed to the core air flowpath 37. Notably, as used herein, the term "exposed to the core air flowpath 37" generally refers to such component being in contact with an airflow through the core air flowpath 37.

More specifically, for the embodiment depicted, each of the rotor disk 108 of the upstream compressor stage 102, the rotor disk 108 of the aft-most compressor stage 100, and the rotor disk 108 of the intermediate compressor stage 104 define cooling holes 202 to allow the compressor cooling air 164 from the cooling air passage 180 to the one or more components of the HP compressor 24 exposed to the core air flowpath 37 to cool the one or more components of the HP compressor 24 exposed core air flowpath 37. For the embodiment shown, the one or more components exposed to the core air flowpath 37 include the attachment portions 110 of the rotor disks 108, the seal teeth 126 of the catenary arms 118, etc.

Notably, as mentioned above, the exemplary rotor disks 108 depicted are configured as circumferential rotor disks, which may assist with dispersing the compressor cooling air 164 provided through the cooling holes 202. However, it should be appreciated that in other embodiments, the rotor disks 108 may instead be configured as axial disks (i.e., wherein the compressor rotor blades 106 are inserted generally along the axial direction A), or alternatively, may be configured as blisks (i.e., wherein the rotor disks 108 and airflow portion of the compressor rotor blades 106 are formed integrally of a single material), or in any other suitable manner. Further, in other exemplary embodiments, the cooling holes 202 may be defined in other locations and/or by other components to cool the one or more components of the HP compressor 24 exposed to the core air flowpath 37.

Furthermore, referring still to FIG. 2, it will be appreciated that in certain embodiments, one or more of the compressor stages located upstream of the aft-most compressor stage 100 may not need as much cooling given that the airflow through such portion of the HP compressor 24 is generally not at as high of a pressure (and therefore, temperature). Accordingly, the airflow member 200 includes features for appropriately distributing the compressor cooling air 164 provided to the cooling air passage 180. More specifically, for the embodiment shown, the airflow member 200 includes at least one of a metering feature 204 or an airflow directing feature to modify an airflow. More specifically, still, the exemplary airflow member 200 depicted includes a metering feature 204 operable with the rotor bore 114 of the rotor disk 108 of the intermediate compressor stage 104 to meter an airflow (i.e., a flow of compressor cooling air 164) between the rotor bore 114 of the rotor disk 108 of the intermediate compressor stage 104 and the airflow member 200. The metering feature 204 may simply be a protrusion on the airflow member 200 extending towards the rotor disk 108 of the intermediate compressor stage 104 to reduce the amount of compressor cooling air 164 that may flow therethrough in a predetermined manner. However, in other embodiments, the metering feature 204 may have any other suitable configuration. However, as noted, in other embodiments, airflow member 200 may additionally or alternatively includes an airflow directing feature, such as a turning vane or a series of turning vanes along the airflow member 200 to function as a pump, similar to an impeller (and similar to the configuration discussed below with reference to FIGS. 6 and 7).

Moreover, it will be appreciated that in other exemplary embodiments, the airflow member 200 may have any other suitable configuration. For example, referring now to FIGS. 6 and 7, a gas turbine engine 10 including an airflow member 200 in accordance with another exemplary embodiment of the present disclosure is provided. The exemplary gas turbine engine 10 depicted in FIG. 6 may be configured in substantially the same manner as exemplary gas turbine engine 10 described above with reference FIG. 2. Accordingly, the same numbers may refer to the same parts.

For example, as is shown, the gas turbine engine 10 generally includes an airflow member 200 extending from a rotor disk 132 of a high pressure spool assembly 128 to a rotor disk 108 of an upstream compressor stage 102 of an HP compressor 24. In such a manner, the airflow member 200 defines a compressor cooling air passage 180 outward of the airflow member 200 along a radial direction R of the gas turbine engine 10. However, for the embodiment shown, the airflow member 200 further includes a plurality of airflow features 206 extending into the compressor cooling air passage 180. For example, the plurality of airflow features 206 extend, for the embodiment depicted, generally along an axial direction A of the gas turbine engine 10, e.g., inward of the rotor disk 108 of an aft-most compressor stage 100 of the HP compressor 24, and further, between the rotor disks 108 of the intermediate compressor stage 104 and upstream compressor stage 102. Notably, however, in other exemplary embodiments, the plurality of airflow features 206 may instead extend at any other suitable location along the airflow member 200.

Figure 6:
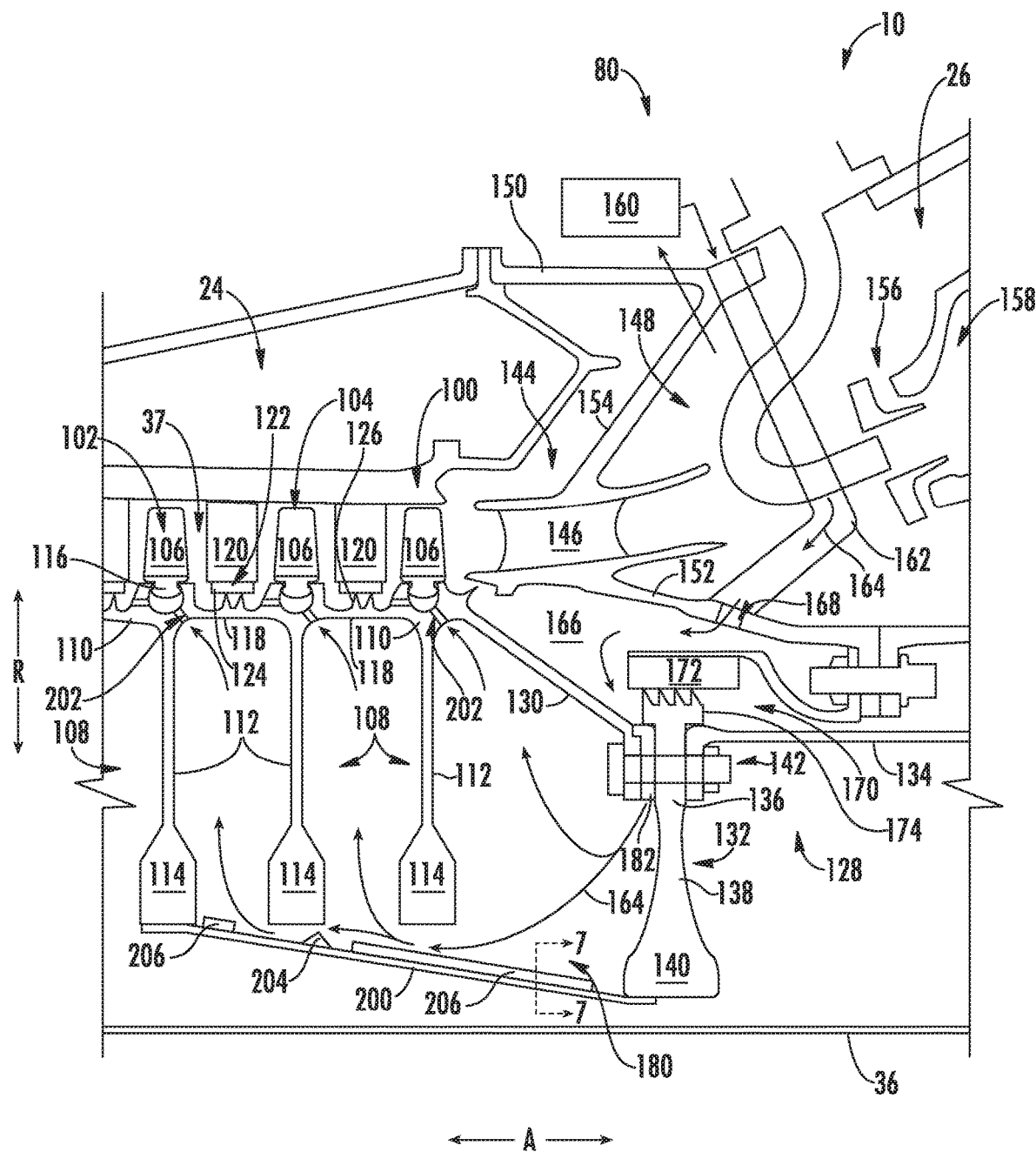
FIG. 6 is a close-up, schematic, cross-sectional view of a portion of a compressor section and combustion section of a gas turbine engine in accordance with another exemplary embodiment of the present disclosure.
Figure 7:
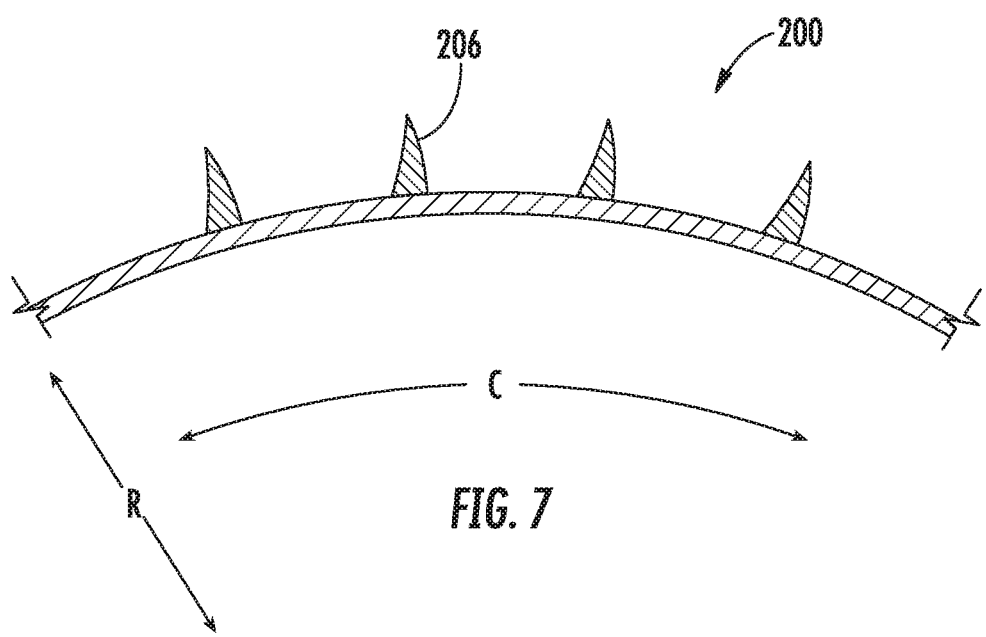
FIG. 7 is a schematic, cross-sectional view of an airflow member in accordance with an exemplary embodiment of the present disclosure, as may be incorporated in the exemplary gas turbine engine of FIG. 6.

Referring now particularly to FIG. 7, providing a cross-sectional view of the airflow member 200 along Line 7-7 in FIG. 6, it will be appreciated that for the embodiment depicted, the plurality of airflow features 206 extending into the cooling air passage 180 are generally configured as blades, the blades spaced along a circumferential direction C of the gas turbine engine 10. In such a manner, the blades may assist with increasing a pressure of the compressor cooling air 164 provided to the compressor cooling air passage 180 through the high pressure spool assembly 128. Notably, however, in other embodiments, the airflow features 206 may have any other suitable configuration.

Furthermore, it will be appreciated that in still other exemplary embodiments, the gas turbine engine 10 may have any other suitable configuration. For example, in other exemplary embodiments, the compressor section, combustion section 26, and/or turbine section may include any other suitable configuration of compressor(s), turbine(s), combustor(s), support member(s), etc.

Figure 8:
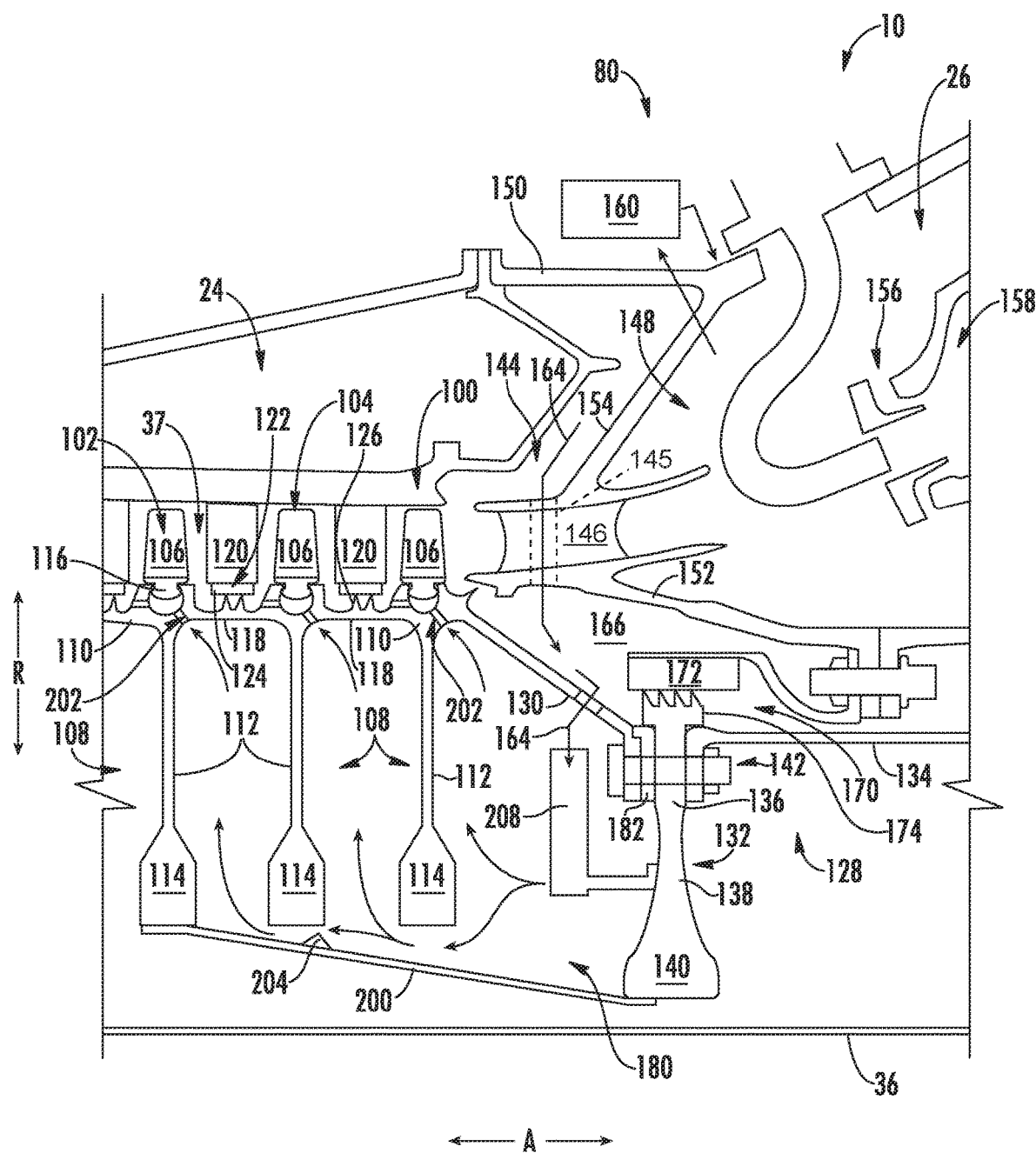
FIG. 8 is a close-up, schematic, cross-sectional view of a portion of a compressor section and combustion section of a gas turbine engine in accordance with yet another exemplary embodiment of the present disclosure.

Additionally, referring now to FIG. 8, a gas turbine engine 10 including an airflow member 200 in accordance with another exemplary embodiment of the present disclosure is provided. The exemplary gas turbine engine 10 and airflow member 200 depicted in FIG. 8 may be configured in substantially the same manner as the exemplary gas turbine engine 10 and airflow member 200 described above with reference to FIG. 2. Accordingly, the same numbers may refer to the same parts.

For example, as is depicted, the gas turbine engine 10 generally includes a compressor cooling air system 80. As with the embodiment above, for the embodiment of FIG. 8, the compressor cooling air system 80 is configured to provide compressor cooling air 164 to a forward CDP seal cavity 166 defined between an inner OGV support arm 152 of a bleed slot 144 of a combustion section 26 of the gas turbine engine 10 and a cone arm 130 of a high pressure spool assembly 128. The compressor cooling air system 80 further includes a heat exchanger 160 configured to receive an airflow from a forward combustion cavity 148 of the combustion section 26, cool such airflow, and provide such airflow as compressor cooling air 164 towards the forward CDP seal cavity 166. However, for the embodiment depicted, the compressor cooling air system 80 does not include a conduit (e.g., conduit 162; see FIG. 2) for providing the compressor cooling air 164 through the forward combustion cavity 148. Instead, the compressor cooling air system 80 is configured to provide such airflow through one or more OGVs 146 of the bleed slot 144 to the forward CDP seal cavity 166. For example, one or more of the OGVs 146 may include a duct 145 extending therethrough (shown in phantom) to allow the compressor cooling air 164 to flow through the one or more OGVs 146 of the bleed slot 144 to the forward CDP seal cavity 166 without passing through the compressed airflow from the HP compressor 24.

Additionally, as with the other embodiments described above, the high pressure spool assembly 128 defines one or more airflow openings 178 extending from the forward CDP seal cavity 166 to a compressor cooling air passage 180 defined at least in part by an airflow member 200 extending from a rotor disk 132 of the high pressure spool assembly 128 to a rotor disk 108 of an upstream compressor stage 102 of the HP compressor 24. By contrast, however, for the embodiment of FIG. 8, the cone arm 130 of the high pressure spool assembly 128 defines the one or more airflow openings 178 extending from the forward CDP seal cavity 166 to the compressor cooling air passage 180. Notably, in order to rotate the compressor cooling air 164 provided through the one or more airflow openings 178 defined by the cone arm 130, the high pressure spool assembly 128 further includes a vortex tube 208. The vortex tube 208 is coupled to the rotor disk 132 of the high pressure spool assembly 128, and is configured to receive the compressor cooling air 164 from the forward CDP seal cavity 166 and provide such compressor cooling air 164 to the cooling air passage 180 in a rotating manner. Such may prevent the compressor cooling air 164 from being substantially heated by the components within the cooling air passage 180 (i.e., if the compressor cooling air 164 is not rotated prior to being provided to the cooling air passage 180, the components within the cooling air passage 180 may force the air to rotate, creating skin friction and increasing a temperature of the compressor cooling air 164).

It will be appreciated that including an airflow member in a gas turbine engine in accordance with one or more of the exemplary embodiments described herein may allow for an HP compressor of a compressor section of the gas turbine engine to reach higher pressures, leading to a higher overall pressure ratio of the compressor section, which in turn may result in an overall more efficient gas turbine engine. More specifically, inclusion of an airflow member in accordance with one or more embodiments of the present disclosure may allow for the gas turbine engine to duct the compressor cooling air to one or more compressor stages positioned forward of an aft-most compressor stage (e.g., an upstream compressor stage and/or an intermediate compressor stage), which may allow for these compressor stages to reach higher pressures without damaging the components exposed to such higher pressure air.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction and comprising:
    a combustion section;
    a compressor section comprising a high pressure compressor, the high pressure compressor comprising an aft-most compressor stage and an upstream compressor stage, each of the aft-most compressor stage and the upstream compressor stage comprising a rotor disk;
    a high pressure spool assembly, the high pressure spool assembly comprising a rotor disk; and
    an airflow member extending from the rotor disk of the high pressure spool assembly to the rotor disk of the upstream compressor stage of the high pressure compressor to define in part a compressor cooling air passage outward of the airflow member along the radial direction; and
    a plurality of cooling holes,
    wherein a cooling airflow originating from airflow downstream of the aft-most compressor stage and in fluid communication with an outlet guide vane passes through the cooling air passage and then through the cooling holes to provide cooling air to one or more components of the high pressure compressor.

2. The gas turbine engine of claim 1, wherein the rotor disk of the upstream compressor stage comprises a rotor bore, wherein the rotor disk of the high pressure spool assembly comprises a rotor bore, and wherein the airflow member extends from the rotor bore of the rotor disk of the high pressure spool assembly to the rotor bore of the rotor disk of the upstream compressor stage.

3. The gas turbine engine of claim 1, wherein the airflow member is positioned inward of the rotor disk of the aft-most compressor stage along the radial direction.

4. The gas turbine engine of claim 3, wherein the high pressure compressor further comprises an intermediate compressor stage located between the aft-most compressor stage and the upstream compressor stage, wherein the intermediate compressor stage comprises a rotor disk, and wherein the airflow member extends inward of the rotor disk of the intermediate compressor stage along the radial direction.

5. The gas turbine engine of claim 4, wherein the rotor disk of the intermediate compressor stage comprises a rotor bore, and wherein the airflow member comprises at least one of a metering feature or an airflow directing feature operable with the rotor bore of the rotor disk of the intermediate compressor stage to modify an airflow between the rotor bore of the rotor disk of the intermediate compressor stage and the airflow member.

6. The gas turbine engine of claim 1, wherein the high pressure spool assembly further comprises a cone arm extending from the rotor disk of the high pressure spool assembly to the rotor disk of the aft-most compressor stage of the high pressure compressor.

7. The gas turbine engine of claim 6,
wherein the combustion section comprises the outlet guide vane located downstream of the high pressure compressor and an inner support arm supporting the outlet guide vane, wherein the inner support arm and the cone arm together define at least in part a forward seal cavity,
wherein the gas turbine engine further comprises: a compressor cooling air system,
wherein the compressor cooling air system is configured to provide compressor cooling air to the forward seal cavity, and
wherein the high pressure spool assembly defines one or more airflow openings extending from the forward seal cavity to the compressor cooling air passage.

8. The gas turbine engine of claim 7, wherein the cone arm defines the one or more airflow openings extending from the forward seal cavity to the compressor cooling air passage.

9. The gas turbine engine of claim 7, wherein the combustion section comprises a compressor discharge pressure seal at least partially sealing off the forward seal cavity, and wherein at least a portion of the compressor discharge pressure seal is coupled to the high pressure spool assembly.

10. The gas turbine engine of claim 1, wherein the airflow downstream of the aft-most compressor stage is airflow through a forward compressor discharge pressure seal cavity.

11. The gas turbine engine of claim 10,
wherein the airflow member comprises a plurality of airflow features extending into the compressor cooling air cavity, and
wherein the plurality of airflow features extend generally along an axial direction of the gas turbine engine.

12. The gas turbine engine of claim 1, wherein the airflow member extends continuously and directly from the rotor disk of the high pressure spool assembly to the rotor disk of the upstream compressor stage.

13. The gas turbine engine of claim 1, wherein the compressor section defines in part a core air flowpath through the gas turbine engine, wherein the rotor disk of the upstream compressor stage defines a cooling hole in airflow communication with the cooling air passage to provide a cooling airflow from the cooling air passage to one or more components of the upstream compressor stage exposed to the core air flowpath.

14. The gas turbine engine of claim 1, wherein the compressor section defines in part a core air flowpath through the gas turbine engine, wherein the aft-most compressor stage is stage N of the high pressure compressor, wherein the high pressure compressor further comprises a stage N−1 having a rotor disk and located immediately upstream of the stage N, wherein the high pressure compressor further comprises a catenary arm extending from the rotor disk of the stage N to the rotor disk of the stage N−1, and wherein the catenary arm, the rotor disk of the stage N−1, or both defines a cooling hole to provide a cooling airflow from the cooling air passage to one or more components of the high pressure compressor exposed to the core air flowpath.

15. A gas turbine engine defining a radial direction and comprising:
a combustion section;
a compressor section comprising a high pressure compressor, the high pressure compressor comprising an aft-most compressor stage and an upstream compressor stage, each of the aft-most compressor stage and the upstream compressor stage comprising a rotor disk;
a high pressure spool assembly, the high pressure spool assembly comprising a rotor disk; and
an airflow member extending from the rotor disk of the high pressure spool assembly to the rotor disk of the upstream compressor stage of the high pressure compressor to define in part a compressor cooling air passage outward of the airflow member along the radial direction;
wherein the high pressure spool assembly further comprises a cone arm extending from the rotor disk of the high pressure spool assembly to the rotor disk of the aft-most compressor stage of the high pressure compressor;
wherein the combustion section comprises an outlet guide vane located downstream of the high pressure compressor and an inner support arm supporting the outlet guide vane, wherein the inner support arm and the cone arm together define at least in part a forward seal cavity, and wherein the gas turbine engine further comprises:
a compressor cooling air system, the compressor cooling air system configured to provide compressor cooling air to the forward seal cavity, the high pressure spool assembly defining one or more airflow openings extending from the forward seal cavity to the compressor cooling air passage; and
wherein the high pressure spool assembly comprises an airflow flange, wherein the airflow flange defines the one or more airflow openings such that the forward seal cavity is in airflow communication with the compressor cooling air passage through the airflow flange.

16. A cooling air passage assembly for a gas turbine engine comprising a high pressure compressor and a high pressure spool assembly, the high pressure compressor comprising an aft-most compressor stage and an upstream compressor stage, each of the aft-most compressor stage, the upstream compressor stage, and the high pressure spool assembly comprising a rotor disk, the cooling air passage assembly comprising:
an airflow member extending from a first attachment end to a second attachment end, the first attachment end configured for attachment to the rotor disk of the upstream compressor stage of the high pressure compressor, and the second attachment end configured for attachment to the rotor disk of the high pressure spool assembly to define in part a compressor cooling air passage;
an airflow flange comprising a plurality of apertures located downstream of the aft-most compressor stage and in fluid communication with both a forward compressor discharge pressure seal cavity and the cooling air passage.

17. The cooling air passage assembly of claim 16, wherein the airflow member comprises a plurality of airflow features configured to extend into the compressor cooling air cavity.

18. The cooling air passage assembly of claim 17, wherein the plurality of airflow features extend generally along an axial direction of the gas turbine engine when the cooling air passage is installed in the gas turbine engine.

19. The cooling air passage assembly of claim 16, wherein the airflow member extends continuously from the first attachment end to the second attachment end.

20. The cooling air passage assembly of claim 16, further comprising:
a metering feature extending from the airflow member for metering an airflow over the airflow member.

* * * * *